(12) United States Patent
Zhang

(10) Patent No.: US 6,894,464 B2
(45) Date of Patent: May 17, 2005

(54) MULTIPHASE SYNCHRONOUS BUCK CONVERTER WITH IMPROVED POWER LOSS BALANCING

(75) Inventor: Jason Zhang, Monterey Park, CA (US)

(73) Assignee: International Rectifier Corporation, El Segundo, CA (US)

( * ) Notice: Subject to any disclaimer, the term of this patent is extended or adjusted under 35 U.S.C. 154(b) by 19 days.

(21) Appl. No.: 10/406,685

(22) Filed: Apr. 3, 2003

(65) Prior Publication Data

US 2004/0000894 A1 Jan. 1, 2004

Related U.S. Application Data

(60) Provisional application No. 60/370,007, filed on Apr. 3, 2002.

(51) Int. Cl.[7] .............................. G05F 1/40; H02M 3/24
(52) U.S. Cl. ........................................ 323/268; 363/97
(58) Field of Search ................................. 323/224, 225, 323/268, 271, 282, 284, 285; 363/16, 21.06, 21.14, 95, 97, 131

(56) References Cited

U.S. PATENT DOCUMENTS

| | | | | |
|---|---|---|---|---|
| 5,528,480 A | * | 6/1996 | Kikinis et al. | ................. 363/15 |
| 5,552,695 A | * | 9/1996 | Schwartz | ................... 323/271 |
| 6,141,225 A | * | 10/2000 | Gak et al. | ...................... 363/25 |
| 6,166,528 A | * | 12/2000 | Rossetti et al. | ............. 323/283 |
| 6,246,220 B1 | * | 6/2001 | Isham et al. | ................. 323/224 |
| 6,437,545 B2 | | 8/2002 | Sluijs | |
| 6,437,546 B1 | | 8/2002 | Kunii et al. | |
| 6,469,482 B1 | | 10/2002 | Jahanshir et al. | |
| 6,522,115 B1 | | 2/2003 | Greitschus | |

* cited by examiner

*Primary Examiner*—Matthew V. Nguyen
(74) *Attorney, Agent, or Firm*—Ostrolenk, Faber, Gerb & Soffen, LLP

(57) ABSTRACT

A multi-phase synchronous buck converter having plural single phase synchronous buck converter stages, connected together to provide an output current to a load. A sensing circuit in each converter stage includes a variable gain current sense amplifier that determines the current through the shunt MOSFET to generate an output signal representative of the output current provided by that converter stage. The gains of the current sense amplifiers in each converter stage are preset such that the output signals from all the amplifiers are substantially equal, thereby balancing the power loss in all the converter stages by adjustment of the output currents using varying current sense gains to compensate for variations in the $R_{DS-ON}$ of the shunt MOSFETS.

20 Claims, 7 Drawing Sheets

MULTIPHASE SYNCHRONOUS BUCK CONVERTER WITH IMPROVED POWER LOSS BALANCING

RELATED APPLICATIONS

The present Application is based on and claims the benefit of U.S. Provisional Application No. 60/370,007, filed on Apr. 3, 2002, entitled MULTI-CHIP MODULE CIRCUIT IMPROVEMENTS, the entire content of which is expressly incorporated herein by reference.

BACKGROUND OF THE INVENTION

1. Field of the Invention

The present invention relates to improvements in multi-phase synchronous buck converters, and in particular, to such devices having improved techniques for output current sensing, for current sharing between modules, and improved transient performance during rapid load changes. The invention is described and shown in the context of a multi-chip module (MCM) implementation, but the improvements disclosed are applicable to discrete component implementations as well.

2. Relevant Art

An MCM is an electronic package which includes multiple integrated circuits (ICs) formed on a common substrate with multiple interconnecting layers, separated by insulating material. The entire module is encapsulated, but not the individual ICs.

MCMs offer several important benefits over circuits formed of separate chips mounted on conventional printed circuit boards. These include increased wiring and component densities, and lower cost. Also, the compact architecture of MCMs can result in shorter signal transmission times and reduced parasitic impedance, which in turn, improves high-speed switching efficiency. Also, including passive components inside MCM makes the MCM more testable as a complete power supply with consequent improved reliability.

MCM packaging is suitable for a wide variety of applications, including multi-phase synchronous buck converters. A synchronous buck converter is a switched D.C. power supply which receives a D.C. (or a rectified A.C.) input and produces a regulated low-voltage output with high output current capacity. Buck converters are particularly useful as power supplies for microprocessor operated devices, and a wide range of other digital circuit applications.

The basic configuration of a synchronous buck converter is illustrated in FIG. 1. The circuit, generally denoted at 100, includes a series switch 102 which is typically a power MOSFET or the like, with its source-drain path connected between an input terminal 104 and a first signal node 106, a shunt switch 108, also typically a power MOSFET or the like, and an output circuit comprised of an series inductor 112 and a shunt capacitor 114 connected to inductor 112 at a signal output node 116 and to ground 110. A shunt diode such a Shottky diode 118 may also be provided in parallel with MOSFET 108 if desired to provide conduction during the deadtimes of 108 to reduce the diode reverse recovery loss associated with the internal body diode of MOSFET 108. A separate diode 118 is not required if the higher switching loss is deemed preferable to the added cost of the external Schottky.

A D.C. input voltage $V_{IN}$ is provided between input terminal 104 and ground 110 across an input capacitor 111, and an output voltage $V_{OUT}$ which is less than $V_{IN}$ is provided to a load 124 connected between signal output node 116 and ground 110.

Control of the output voltage is provided by selectively varying the on-off duty cycles of MOSFETS 102 and 108. This is done by a gate control logic or driver circuit 120 connected to the gate terminals of the MOSFETS, and driven by a pulse width modulation circuit 124 comprised of a PWM generator 124 which compares a ramp signal of the required switching frequency and having fixed maximum (peak) and minimum (valley) values with a signal provided by an error amplifier 126. The latter provides an output signal $V_E$ based on the difference between the actual output voltage represented by a feedback signal $V_{FB}$ on signal line 128 and a desired output voltage signal $V_{REF}$ provided at a second input terminal 130.

In operation, with MOSFET 102 on and MOSFET 108 off, the voltage across inductor 112 is equal to $V_{IN}-V_{OUT}$, and the resulting current charges capacitor 114. To maintain substantially constant voltage across capacitor 114, a predetermined value of $V_E$ operates PWM circuit 124 and gate driver 120 to switch MOSFET 102 off, and MOSFET 108 on. The very low source-drain resistance of MOSFET 108 when it is conducting maintains a circuit to sustain the current flow through inductor 112. This, in turn, allows capacitor 114 to charge, and after several on-off cycles for the MOSFETS, a steady-state output voltage is achieved. The operation of the circuit shown in FIG. 1 is well known to persons skilled in the art, and a further description will be omitted in the interest of brevity.

Where output currents exceeding the capacity of MOSFETS 102 and 108 are required, a multi-phase buck converter can be employed, as illustrated schematically by circuit 200 shown in FIG. 2. Here, N synchronous buck converters stages 202A–202N are connected between an input node 108 and a common ground 210 and with their outputs feeding an output node 212. Thus, each stage contributes a portion of the required current demand.

Converter stage 202A includes an input capacitor 203, a MOSFET pair 204, an a shunt Shottky diode 205, an output inductor 206, an output capacitor 214, and a gate drive circuit 216. The other converter stages are similarly constructed.

A master PWM controller 218 generates N interleaved or out of phase PWM signals with 360°/N phase delay between phases. Master controller 218 may be constructed in any suitable or desired manner, and may be comprised, for example, of an adjustable frequency master clock 220 operating at a frequency $F_M = N \cdot f_{SW}$, where N is the number of phases, and $f_{SW}$ is the predetermined switching frequency for the MOSFETS, a programmable counter 222 to generate a pulse train at frequency $f_{SW}$, a succession of N series-connected PWM circuits 224A–224N, and an error amplifier 226. The latter provides a common input to trigger the PWN circuits whereby a series of drive signals PWM-1 through PWM-N are provided as inputs to gate driver 206 in converter stages 202A–202N.

The drive signals are separated by a phase delay of 360/N, as shown in FIG. 3, which illustrates the timing of the synchronization signals for a five-phase converter with a 5 MHz clock frequency, and a 1 MHz switching frequency. From this, it will be seen that the five converter stages operate in a staggered fashion during five successive 1 MHz switching cycles, each interleaved by $(\frac{1}{5})*10^{-6}$ sec. As multi-phase synchronous buck converters are well known to those skilled in the art, further details concerning the arrangement shown in FIG. 2 are omitted (as in the case of FIG. 1) in the interest of brevity.

There are, however, certain respects in which further improvements to existing designs for synchronous buck converters would be desirable. Among these are:

(a) Improved ways of generating the current feedback signal for input to the PWM controller. The output voltage and the current sharing in the individual converter stages of a multi-phase converter are controlled by the switching duty cycle for the MOSFETS. Since high output currents favor "lossless" type sensing, the current feedback signal is conventionally generated by a sample and hold circuit 400 such as illustrated in FIG. 4. Here, the voltage across the $R_{DS-ON}$ of shunt MOSFET 402 is sampled once during each MOSFET switching cycle. Sample and hold circuit 400 includes transistors 404 and 406 (shown for simplicity as on-off switches) and a capacitor 408.

Alternatively, if the $V_{IN}$ to $V_{OUT}$ ratio is such that the series FET has large duty cycle, the voltage across the $R_{DS-ON}$ of the series MOSFET rather than the shunt MOSFET can be sampled.

Either way, however, due the small value typical of $R_{DS-ON}$, however, the sampled voltage signal must be amplified by amplifier 410.

There are several drawbacks to this approach. For one thing, amplifier 410 needs to have a high bandwidth and high slew rate to accurately sample the voltage across the $R_{DS-ON}$ of shunt MOSFET 402. Also, the output of amplifier 410 takes time to settle which limits its high frequency response. Further, there is inherently a large current ripple content in the inductor current, and it is reflected in a ripple voltage across $R_{DS-ON}$. Depending on the timing of sampling, the sampled signal may not reflect the D.C. output current, so the inductor ripple current magnitude and sampling timing can affect current sensing error.

(b) Current sharing among Converter Stages. MCM construction can advantageously be used for multi-phase synchronous buck converters. MCMs can be provided for each converter stage, (including, if desired, the input and output capacitors and the series inductor in the converter stage module), and also for the master PWM controller 218 as indicated by the topology of FIG. 2. Conventionally, a separate controller is provided to control current sharing, or the function is incorporated in the master PWM controller. Both approaches are complex and do not lend themselves well to scaling the number of phases. Also, due to the large output currents, lossless sensing is normally employed, with the consequent drawbacks described above. Moreover, the selection of current sense gain is not on a stage-by-stage basis. This leads to inaccurate current sharing because in MCM construction, the $R_{DS-ON}$ of the shunt MOSFET can vary between modules, and also with temperature and gate voltage.

(c) Variations in Conduction Losses between Modules. Module-to-module variation of $R_{DS-ON}$ also can cause unbalanced conduction losses in the shunt MOSFET. More particularly, in a multi-phase power supply, the total output current deliverable is determined by the weakest, i.e., hottest running module. To maximize the output current capability, the weakest module should be called on to deliver the least current, and therefore power sharing is even more important than current sharing.

Conventional designs do not provide effective power sharing. To understand this, with reference again to FIG. 2, consider a two-stage converter, i.e., N=2. Assume also the following:

$R_{DS-ON}$ of shunt MOSFET # (in module 202-1)=0.005Ω

$R_{DS-ON}$ of shunt MOSFET (in module 202-2)=0.006Ω

Output current $I_{OUT}$=20 A $V_{IN}$=12.0V $V_{OUT}$=1.0V

Using conventional MOSFET $R_{DS-ON}$ current sensing, and considering the two phase modules in parallel, the current in each phase will actually be determined by the effective parallel resistance. In other words, the current in module 202-1 will actually be 20*6/(5+6)=10.9 A, and the current in module 202-2 will actually be 20*5/(5+6)=9.1 A. Thus, the respective $I^2$ R losses will be 0.59 W and 0.5 W.

Even on the assumption of perfect current sharing, i.e., that each module may somehow be designed to contribute exactly 10.0 A of the 20 A output, the $I^2$ R loss in module 202-1 will be 0.5 W, and 0.6 W in module 202-2. As may be understood, the situation can be much worse with greater $R_{DS-ON}$ imbalance.

(d) Undesirable transient behavior during load changes. When there are rapid load transitions, asymmetrical output voltage overshoot and undershoot are observed due to the large ratio of $V_{IN}$ and $V_{OUT}$. The output voltage overshoot with load step-down is usually greater than the undershoot with load step-up. To prevent voltage overshoot, large and costly output capacitors have conventionally been used.

It may thus be seen that there are still problems with multi-phase synchronous buck converters according to the state of the art. The present invention seeks to alleviate some of these problems.

BRIEF DESCRIPTION OF THE INVENTION

According to the present invention, an improved circuit for generating a current sense feedback signal for input to the error amplifier includes a sampling switch connected through a low-pass filter such as an RC averaging circuit to an amplifier which provides the feedback signal $V_{FB}$. The sampling transistor is gated in common with the shunt MOSFET so that the two are on at the same time. A slight delay may be provided, if necessary or desired, between the time the MOSFET is gated on and the time of sampling to ensure that the MOSFET is fully on before turning on the averaging circuit. Alternatively, if the duty cycle for the series MOSFET is long and that of the shunt MOSFET is short (e.g., with a small $V_{IN}$ to $V_{OUT}$ ratio), the voltage across the $V_{RDS-ON}$ of the series MOSFET can be sampled, rather than the shunt MOSFET.

By employing a low pass filter, the D.C. voltage across the capacitor of the RC circuit will be proportional to the D.C. value of the inductor current, irrespective of the inductor value and ripple current magnitude.

Also, if the current sensing IC circuit is packaged in a single MCM with the converter stage, the current sense gain can be trimmed based on the $R_{DS-ON}$ value. The current sense gain can also be adjusted according to the module temperature by using temperature sensitive devices inside the IC to eliminate the $R_{DS-ON}$ temperature variation, and according to the gate voltage to eliminate the $R_{DS-ON}$ variation due to gate voltage changes.

Improved current sharing according to this invention is provided using a gate driver including a duty cycle trimming circuit which selectively delays the leading edge of incoming PWM signal and thereby shortens the on-time of the series MOSFET. The delay time is determined by a current sharing control circuit including an amplifier that magnifies the current difference between a signal representing the module current level and a signal on an I-share bus which is connected in common to all of the module current level signals through a coupling circuit.

In one embodiment, the coupling circuit is comprised of respective resistors in each the modules to provide a bus signal representing the average value of currents in the respective converter stages. Thus, the input of the amplifier in the each stage represents the difference between the actual measured inductor current in that stage, and the average value of the inductor currents in all the stages. This difference, which is reflective of propagation delays, $R_{DS\text{-}ON}$, and other stage-to-stage parameter variations, is used by the duty cycle trimming circuit in the module to make fine adjustments to the duty cycle to balance the current flowing through the module to the averaging per phase output current. As a variation of the foregoing, the current imbalance can be corrected by selectively increasing the duty cycle through extending the trailing edge of the PWM signal of each module.

In another embodiment, the input resistors in each of the converter stages may be replaced by diodes which function as an AND circuit, with the lowest value of the current sense signals in the respective converter stages dominating I-share bus. A signal corresponding to that lowest current value will therefore appear on the I-share bus as an input to each of the summing/isolation amplifiers and the outputs of each of the summing/isolation amplifiers will cause the respective duty cycle trimming circuits to reduce the duty cycles, and correspondingly, the output currents, for all stages to match that of the lowest current stage.

As a further variation, the diodes in the I-share control circuits, can be connected to function collectively as an OR circuit with the highest value of the current sense signals in the respective converter stages dominating I-share bus. In this configuration, the respective duty cycle trimming circuits will operate to increase the duty cycles, and correspondingly, the output currents, to match the output current of the highest current stage.

To provide compensation for power loss variations between converter stages of a multi-phase system, the gain of the current sense amplifier in each stage, can be trimmed on the basis of the difference between the actual measured value of the $R_{DS\text{-}ON}$ of the shunt MOSFET of that stage and an average $R_{AV}$ of the $R_{DS\text{-}ON}$ values for shunt MOSFETS of the type employed. This may be determined historically, for example, from production test data.

Since the current sense amplifier and the MOSFETS can be placed inside an MCM, the gain of the current sense amplifier can be trimmed in a post-packaging step. During production testing, a predetermined calibration current can be injected into the shunt MOSFET while it is conducting, and the circuit calibrated in any conventional or desired manner, e.g., by blowing internal fuses to set the amplifier output voltage to a level corresponding to the desired gain.

Improved transient performance of a synchronous buck converter stage particularly during load step down according to this invention is provided by disabling shunt MOSFET 108 entirely during step-down. As a consequence, the current will flow through the body diode of MOSFET and the parallel Shottky diode 118, rather than through the channel of the MOSFET, as it would if the MOSFET were on. This is advantageous because the voltage drop across the body diode and Shottky diode can be significantly greater than across the channel of the conducting MOSFET, thereby allowing faster dissipation of the transient current.

It is accordingly an object of the invention to provide improved current sensing in a synchronous buck converter by removing the effect of inductor ripple current on the current sense circuit.

It is another object of the invention to provide improved current sharing among converter stages of a synchronous buck converter.

It is a further object of the invention to reduce variations in conduction losses between modules in a multi-phase synchronous buck converter constructed using MCM techniques.

It is also an object of the invention to improved transient behavior during load changes in a synchronous buck converter.

Other objects and features of the present invention will become apparent from the following description of the invention in conjunction with the accompanying drawings.

DETAILED DESCRIPTION OF THE INVENTION

Figure 5:
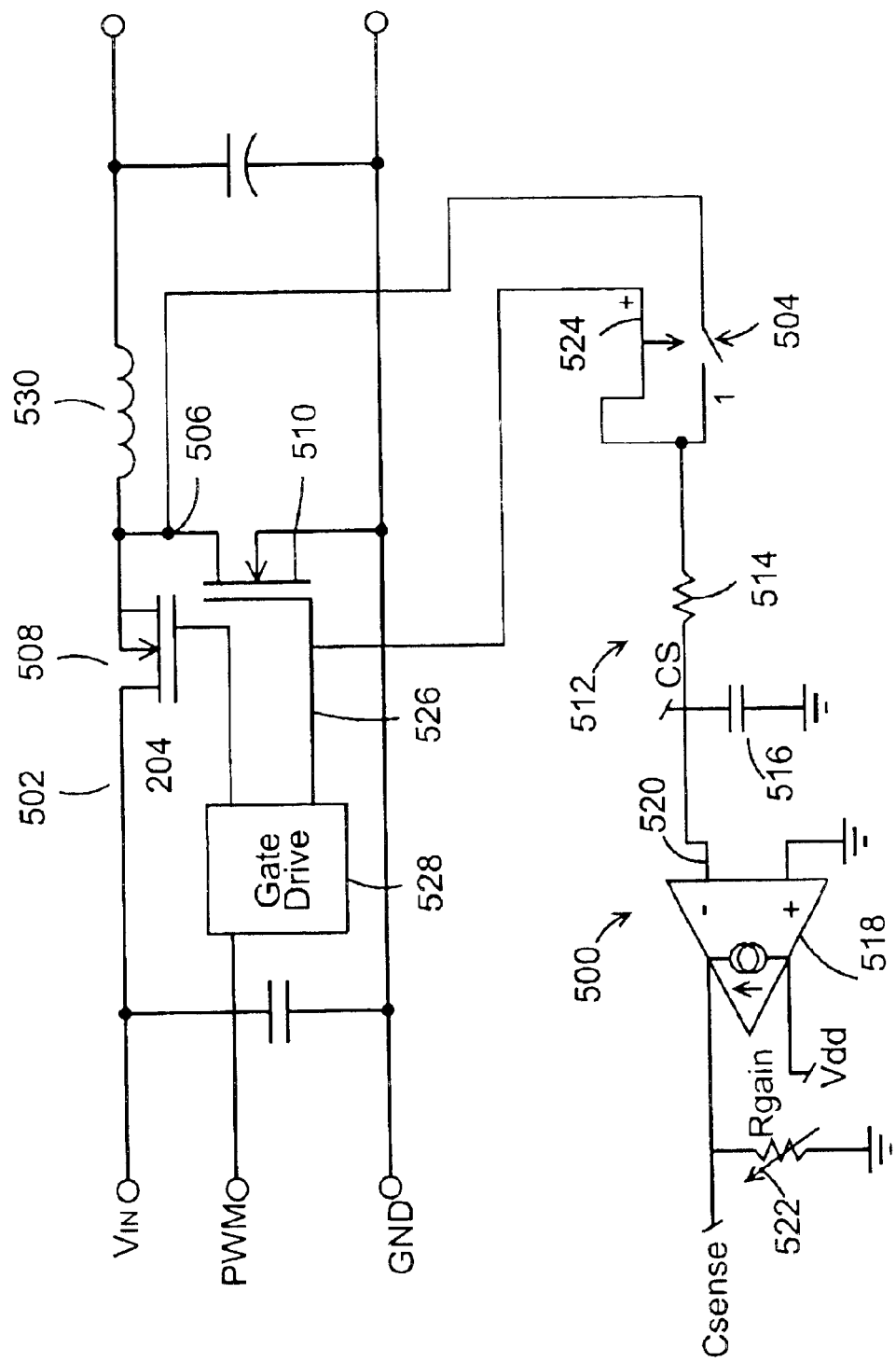
FIG. 5 is a schematic diagram of an improved sample and hold circuit according to the present invention that removes the ripple current sensitivity.

FIG. 5 illustrates C-sense circuit 500 which provides improved average current sensing according to the invention. This may be separately, i.e., as a stand-alone circuit with a converter circuit 502. Circuit 500 includes a sampling switch 504 which maybe a transistor of any suitable or desired type, having its signal input connected to the common signal node 506 between MOSFETS 508 and 510 in converter circuit 502. The signal output of sampling transistor 504 is connected to a low pass filter of any suitable or desired type, e.g., a RC averaging circuit 512 including a series resistor 514 and shunt capacitor 516. An amplifier 518, which may be a transconductance amplifier or the equivalent, has an input 520 connected across capacitor 516, and provides output current proportional to the input voltage across a variable gain control resistor 522. The voltage-to-current gain (gm) of the transconductance amplifier and the value of 522 determine the current sense gain. Gm and 522 can adjusted to compensate the initial $R_{DS}$ variations, temperature and gate voltage induced $R_{DS}$ changes.

The control terminal 524 of sampling transistor 504 is connected in common with the gate terminal of shunt MOSFET 510 to an output 526 of gate driver 528 so that switch 504 and MOSFET 510 are on at the same time. In some instances, it might be necessary or desirable to provide a slight delay between the time MOSFET 510 is turned on, and the time the voltage across $R_{DS-ON}$ is sampled to allow for the finite turn-on time of the MOSFET. The delay may be provided in gate driver 528 (in which case, a separate output will be provided to switch 504), by an RC circuit, or in any or suitable or desired manner.

By using a low pass filter such as RC averaging circuit 512 in relation to the switching period of MOSFET 510, the D.C. voltage across capacitor 516 will be proportional to the D.C. value of the inductor current, irrespective of the inductance and ripple current magnitude.

Alternatively, if circuit 500 is packaged in a MCM with converter stage 502, compensation can be provided for variations in $R_{DS-ON}$ due to temperature changes by use of a temperature sensitive resistor or diode together with gain adjusting resistor 522 to control the gain of amplifier 518. In particular, reducing the gain at the same rate as the change of change of $R_{DS}$ with temperature will maintain a constant current sense gain. The same rule applies to gate voltage compensation. To calibrate for initial $R_{DS}$ variation from part to part, a predetermined calibration current, e.g., 1 A, can be injected to shunt MOSFET 510 during test, and the gain adjusted until the Csense voltage is at a desired value, e.g., 50 mV for a 50 mV/A gain.

As will be recognized by those skilled in the art from the foregoing description, the low pass filter can be implemented in various ways depending on the actual application. In the case of RC filter 512, selecting a long time constant will provide more precise D.C. information at the expense of the speed of data acquisition. In addition, other low pass filter implementations are possible, e.g., the gain bandwidth of amplifier can be lowered, important idea being to use a low bandwidth filter somewhere in the signal path to remove the ripple effect.

It will also be recognized by those skilled in the art from the foregoing description that the implementation shown in FIG. 5 in which the Rds current in the shunt MOSFET is sampled, is advantageous because its duty cycle is large when the $V_{IN}$ to $V_{OUT}$ ratio is large. However, in other applications e.g., where the $V_{IN}$ to $V_{OUT}$ ratio is smaller, the series MOSFET will have a longer duty cycle than the shunt MOSFET, and its $R_{DS-ON}$ voltage can be more conveniently sampled.

It will further be recognized by those skilled in the art that the current information signal provided by amplifier 518 can be used by the master controller 218 (see FIG. 2) to perform voltage positioning or output voltage drooping (lower $V_{OUT}$ with higher $I_{OUT}$ to have square-wave type transient response to fully use the regulation window for both overshoot and undershoot), or to perform over-current protection. In other words, the availability of accurate output current information provides many benefits.

Figure 6:
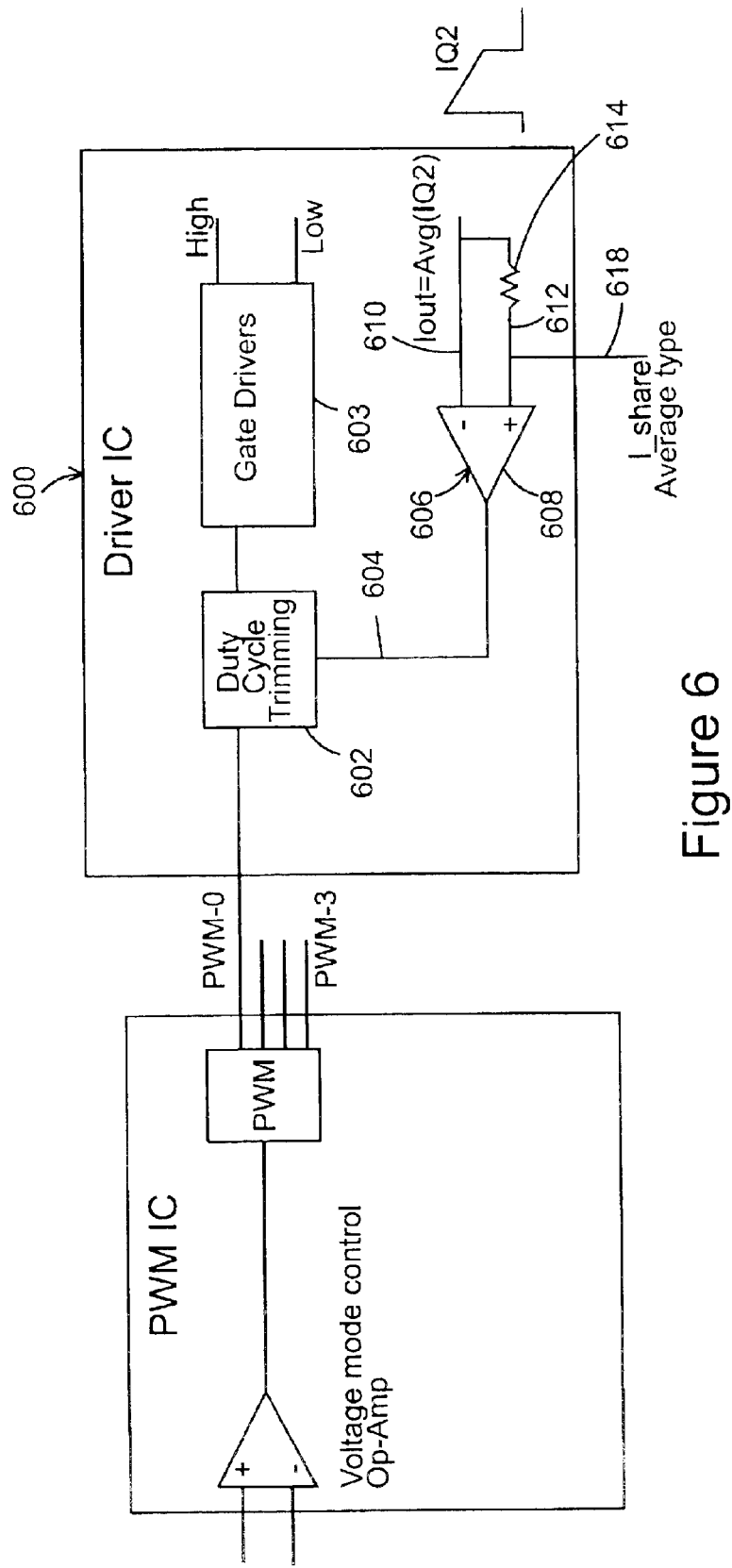
FIG. 6 is a schematic diagram of a technique for providing duty cycle trimming control to compensate for parameter variations between converter stages in a multi-phase buck converter which allows improved current sharing among stages according to the present invention.

FIG. 6 shows a circuit which can be used in a multi-phase converter system to provide improved current sharing. Here, the incoming PWM signal is coupled to a modified gate drive circuit 600 which includes a duty cycle trimming circuit 602 and a conventional gate driver unit 603. Duty cycle trimmer 602 may be constructed in any suitable or desired manner to selectively delay the leading edge of incoming PWM signal and thereby shorten the on-time of the series MOSFET. The delay time is determined by a control input provided over line 604 from a current sharing control circuit 606.

One preferred implementation of current sharing control circuit 606 is comprised of a current sharing amplifier 608 that receives a first input at terminal 610 representing an average current output value for the converter stage, and a second input terminal 612 connected to terminal 610 through an summing resistor 614. A like circuit arrangement is also provided in each of the other converter modules in the multi-phase system.

The average output current signals for each stage can be provided in any suitable or desired manner. A preferred implementation is to incorporate a C-sense circuit such as 500 shown in FIG. 5 with a converter stage including a driver IC as shown in FIG. 6 in a single MCM, thereby obtaining the benefit of the reduced sensitivity to part-to-part parameter differences and to environmental variations as described above. It should be understood, however, that other current sensing circuits, even lossy measurement methods which employ a resistor in series with the output inductor, can be employed.

Amplifier input 612, and the corresponding amplifier inputs in each of the other converter modules corresponding to input 612, are connected to an I-share bus 618. In the circuit configuration shown, the summing resistors (corresponding to resistor 614 illustrated in FIG. 6), in all the modules collectively function to provide a signal on I-share bus 618 representing the average value of currents measured in the respective converter stages.

Thus in the configuration shown in FIG. 6, amplifier 608 magnifies the difference between the signal representing the actual measured inductor current level for the module at input 610, and the signal on I-share bus 618 representing the average value of the inductor currents in all of the converter stages. This difference, which is reflective of propagation delays, $R_{DS-ON}$, and other stage-to-stage parameter variations, is used by the duty cycle trimming circuit in the module to make fine adjustments to the duty cycle to balance the current flowing through the module to the averaging per phase output current.

As a variation of the foregoing, the current imbalance can be corrected by selectively increasing the duty cycle through extending the trailing edge of the PWM signal of each module.

Figure 2:
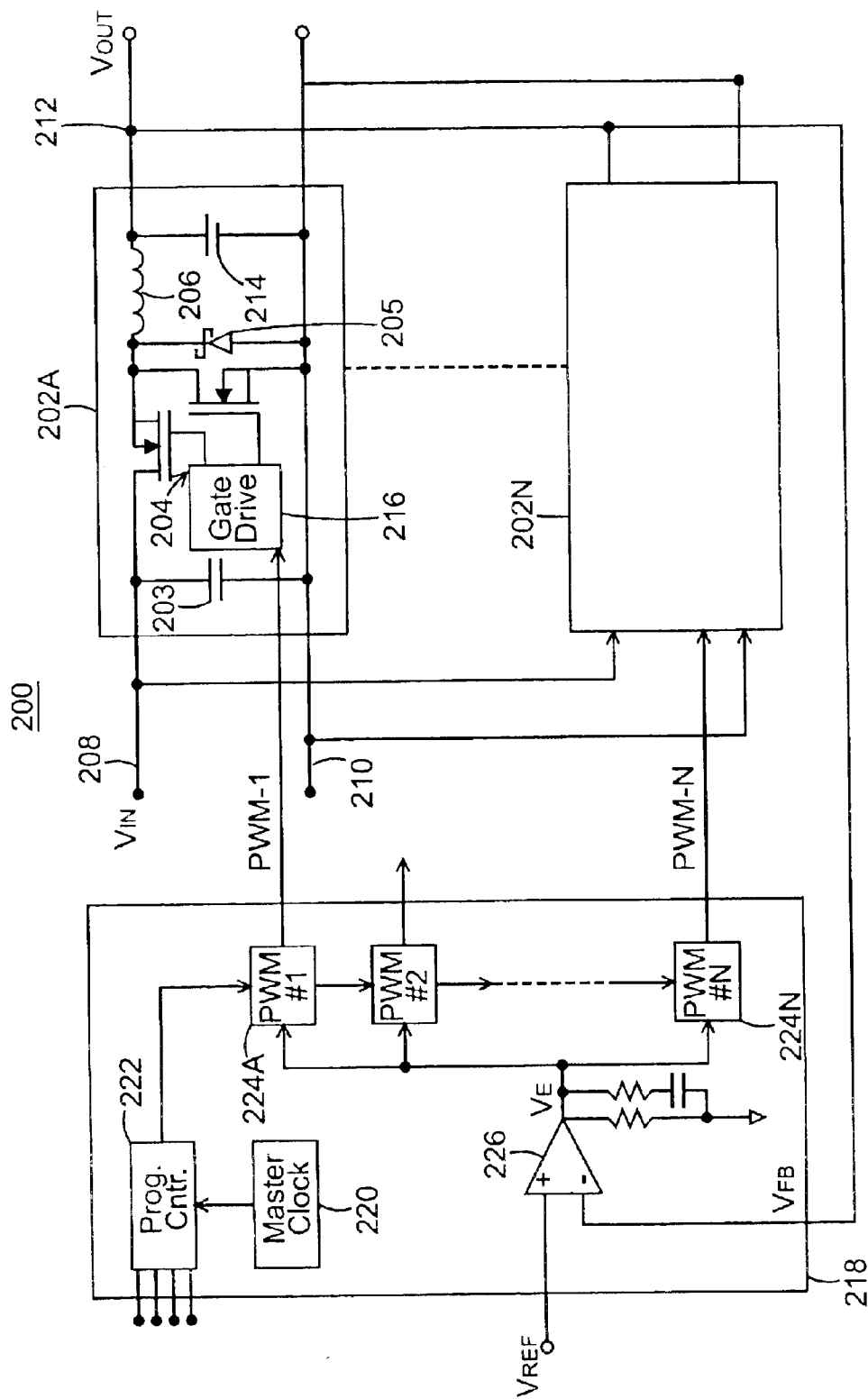
FIG. 2 is a schematic diagram of a multi-phase synchronous buck converter which again illustrates basic features of such devices, and certain aspects of the present invention.
Figure 3:
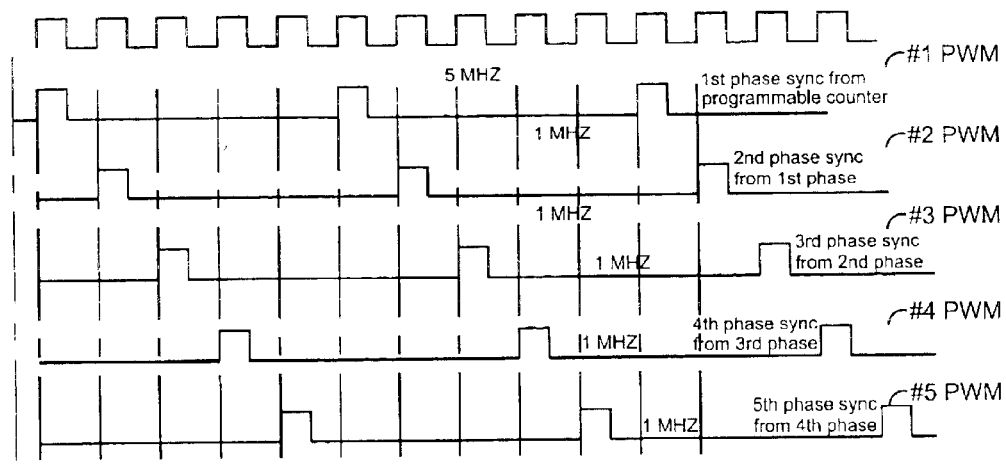
FIG. 3 is a waveform diagram showing the relationship between the PWM pulses for a multi-phase synchronous buck converter.
Figure 4:
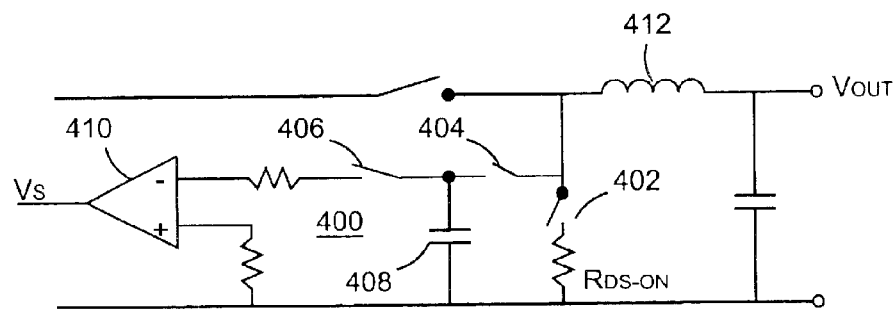
FIG. 4 is a schematic diagram of a conventional technique for current sensing using the $R_{DS\text{-}ON}$ method.

The voltage on I-share bus 618 may also be used to provide the feedback signal $V_{FB}$ provided as one of the inputs to the error amplifier 226 (see FIG. 2). In the configuration shown in FIG. 6, the I-share bus voltage is proportional to $I_{OUT}/N$, where $I_{OUT}$ is the output current and N is the number of converter stages.

The I-share bus voltage may also be utilized in the various ways mentioned above in connection with the use of the C-sense output of current sensing circuit 500 illustrated in FIG. 5.

Figure 6A:
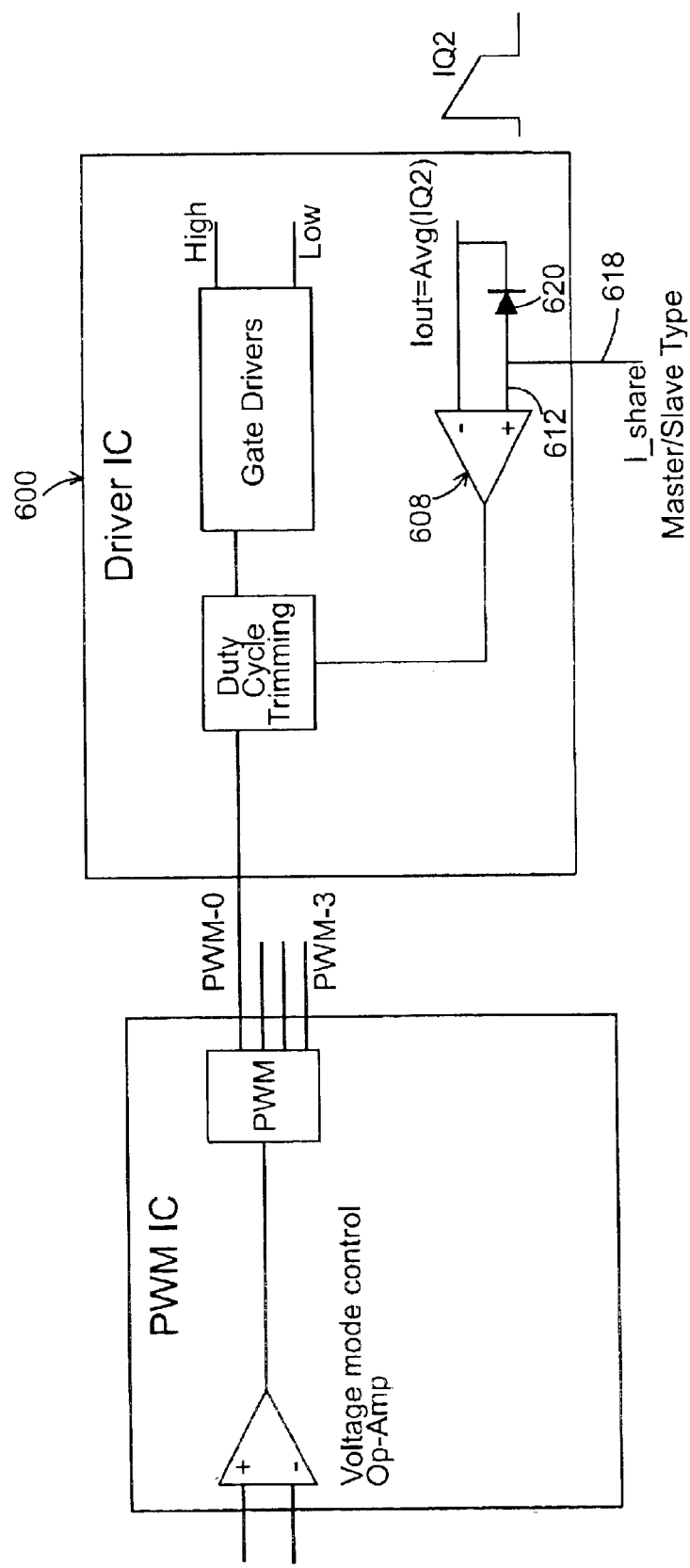
FIG. 6A shows a variation of the technique illustrated in FIG. 6.

In a second embodiment, resistor 614, and the corresponding resistors in each of the other converter stages, may be replaced by diodes 620 as illustrated in FIG. 6A. In such an arrangement, the diodes function as an AND circuit, with the lowest value of the current sense signals in the respective converter stages dominating I-share bus 618. A signal corresponding to that lowest current value will therefore appear on the I-share bus 618 as an input to each of the summing/isolation amplifiers such as amplifier 608, and the outputs of each of the summing/isolation will cause the respective duty cycle trimming circuits to reduce the duty cycles, and correspondingly, the output currents, for all stages to match that of the lowest current stage.

As a further variation, the diode 620, and the corresponding diodes in the other I-share control circuits, can be reversed from the orientation shown in FIG. 6A. In that case, the diodes function collectively as an OR circuit with the highest value of the current sense signals in the respective converter stages dominating I-share bus 618. Difference signals will therefore exist at the outputs of each of the other I-share control. In that case, the respective duty cycle trimming circuits will operate to increase the duty cycles, and correspondingly, the output currents, for those stages, to match that of the highest current stage.

As yet a further variation applicable to the topologies illustrated in FIGS. 6 and 6A, all the duty cycle trimmers corresponding to duty cycle trimmer 602 may implemented as a separate duty cycle trimmer controller formed as a discrete IC separate from the driver IC, or may even be part of the master PWM controller. Likewise, the current sharing control circuits corresponding to current sharing control circuit 606 may also be implemented as a separate duty cycle trimmer controller formed as a discrete IC separate from the driver IC, or may even be part of the master PWM controller.

Referring back to FIG. 5, using similar concepts, it is also possible to compensate for power loss variations between converter stages of a multi-phase system. To accomplish this, one may use a scheme in which the gain of the current sense amplifier in each stage, e.g., amplifier 518 shown in FIG. 5, is trimmed by setting the value of resistor 522 and the transconductance gain of the amplifier according to the difference between the actual value of the $R_{DS-I}$ of the shunt MOSFET of the I-th stage and an average value $R_{AV}$ of $R_{DS-ON}$ values for shunt MOSFETS of the type employed, determined statistically, for example, from historical production test data, thereby balancing the power through changing current distribution by using varying current sense gains.

Several possible algorithms can be employed to achieve power balancing according to this aspect of the invention. One preferred algorithm can take advantage of the relationship:

$$A_1 = \left(1 + \frac{(R_{DS-1} - R_{AV})}{2R_{AV}}\right) * A_0 \qquad (1)$$

where $A_1$ is the amplifier gain for the I-th module, and $A_0$ is a nominal (design value) of current sense gain. Using this approach, the output signal of the current sense amplifier corresponding to amplifier 518 in FIG. 5 will be forced to be the same in all of the modules, but to achieve this according to Eq. (1), the current sense amplifiers in each module will have to exhibit varying gains, and the module with highest gain for its current sense amplifier will have lowest actual current.

More precisely, the percentage of current shift from average is half of the $R_{DS}$ shift from $R_{DS}$ average. For example, a module with 10% higher $R_{DS}$ than average, needs to have gain 5% higher than nominal, so the current will be 5% less than average. This will provide equal power ($I^2R_{DS}$) loss for all the modules.

Referring again to FIG. 5, power loss balancing calibration according to the described algorithm can be accomplished during testing by injecting a predetermined calibration current (1 amp, for example), to the shunt MOSFET of each stage. The $R_{DS\_ON}$ value of the shunt MOSFET can be obtained by measuring the voltage drop across the MOSFET. Then based on Eq. (1) above, and the measured $R_{DS\_ON}$ value, the desired gain of this stage can be calculated, and the gain resistor 522 in FIG. 5 adjusted until the desirable output voltage is obtained at the Csense node.

As will be appreciated by those skilled in the art, other algorithms can be employed to provide balanced power losses in the converter stages according to the underlying concept of power balancing through changing current distribution by using varying current sense gains in the converter modules.

Referring again to FIG. 1, a technique will now be described for improving transient performance of a synchronous buck converter stage during load transitions. As is known, a load step-up, i.e., an increase in the current demand tends to drive the output voltage down, and this is compensated for by increasing the on-time for the series MOSFET 102, and decreasing the off-time for the shunt MOSFET 108.

Conversely, a load step-down, i.e., a decrease in the current demand tends to drive the output voltage up, and this is compensated for by decreasing the on-time for the series MOSFET 102, and increasing the off-time for the shunt MOSFET 108.

Figure 1:
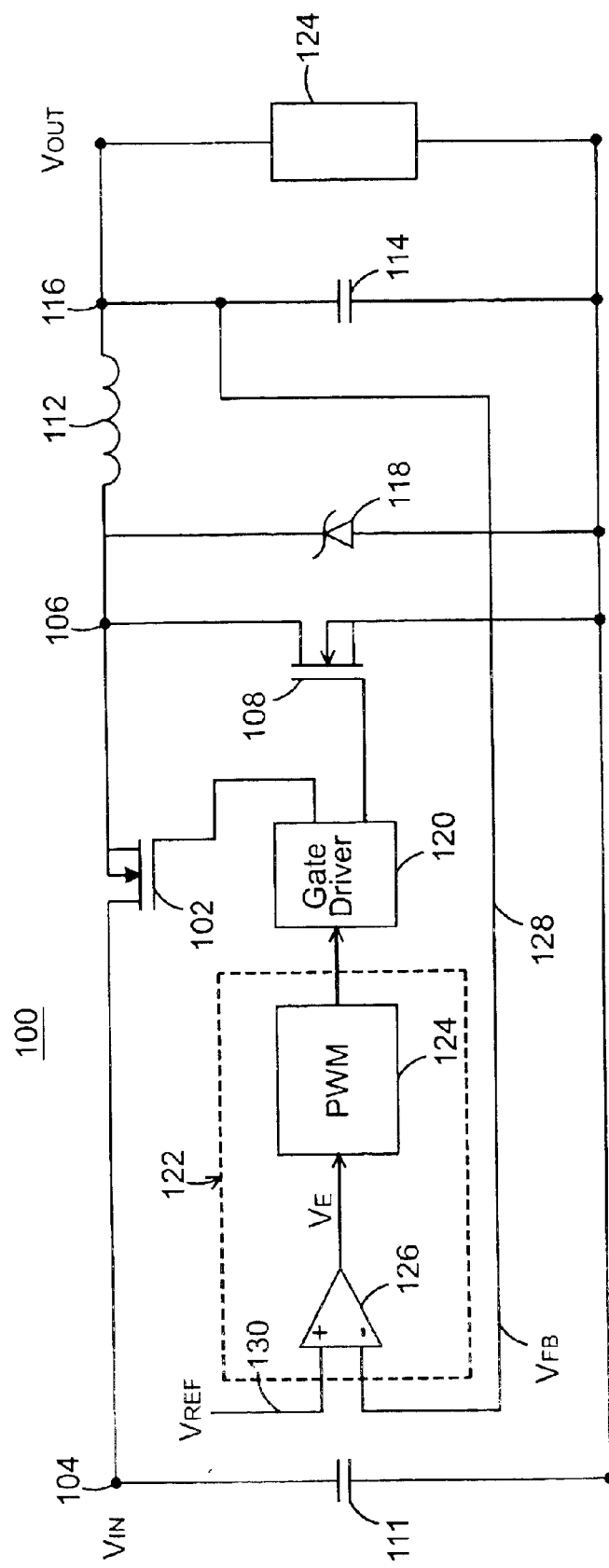
FIG. 1 is a schematic diagram of a synchronous buck converter useful in explanation of the operation of such devices in general, and also of certain features of the invention.

From FIG. 1, for example, if $V_{IN}$ is 12 volts, and $V_{OUT}$ is 1.0 volt. it is apparent that when series MOSFET 102 is turned on and shunt MOSFET 108 is turned off to increase the current through inductor 112, the voltage across inductor 112 will be $V_{IN}-V_{OUT}=11V$, which will drive the inductor current up. When series MOSFET 102 is turned off and shunt MOSFET 108 is turned on, the voltage across inductor 112 will be applied be $-V_{OUT}=-1V$, which will drive the inductor current down. During steady-state operation, the current rising portion is the same as the current falling portion inside inductor 112, while the D.C. content of the current is the same as the output current. At the moment of load step down, the inductor current will be higher than the output current so that the current difference will flow into the output capacitor 114 to create an output voltage overshoot. This overshoot will not stop until the inductor current drops to the reduced output load current level. The rate of current dissipation will affect how big the overshoot, but it is determined by the negative voltage across the inductor.

As the overshoot is inversely proportional to the output capacitance, large and costly output capacitors are customarily used to reduce the overshoot. To avoid this, according to the present invention, it has been found that it is possible to discharge the energy in the inductor more quickly by disabling shunt MOSFET 108 entirely during step-down. As a consequence, the current will flow through the body diode of MOSFET 108, and the parallel Shottky diode 118, rather than through the channel of MOSFET 108, as it would if the MOSFET were on.

This is advantageous because the voltage drop across the body diode and Shottky diode 118 can be significantly greater than across the channel of the conducting MOSFET, allowing the inductor current to dissipate much more rapidly. In the example of a 12 volt input and an intended 1.0 volt output, if the voltage drop across the body diode and the Shottky diode is about 0.7 volts (a typical value), the inductor voltage is $V_{OUT}$, or 1V in the example. With MOSFET 108 disabled during load step down, this voltage will increase to $V_{OUT}+V_{DIODE}=1+0.7=1.7V$, which is 70% increase, and the inductor current will be reduced at a rate that is 41% faster than conventional method. Accordingly, 41% of the inductor energy will be absorbed by the diode instead of transferring to the output capacitor to create voltage overshoot.

To implement this aspect of the invention, the gate drive circuit can be modified so that when the duty cycle for the series MOSFET drops to zero (as determined by monitoring the PWM signal), both MOSFETS are turned off. A preferred circuit for accomplishing this in the context of a single phase converter is shown in FIG. 7, but other suitable implementations are possible, as will be obvious to those skilled in the art in light of the above description.

Figure 7:
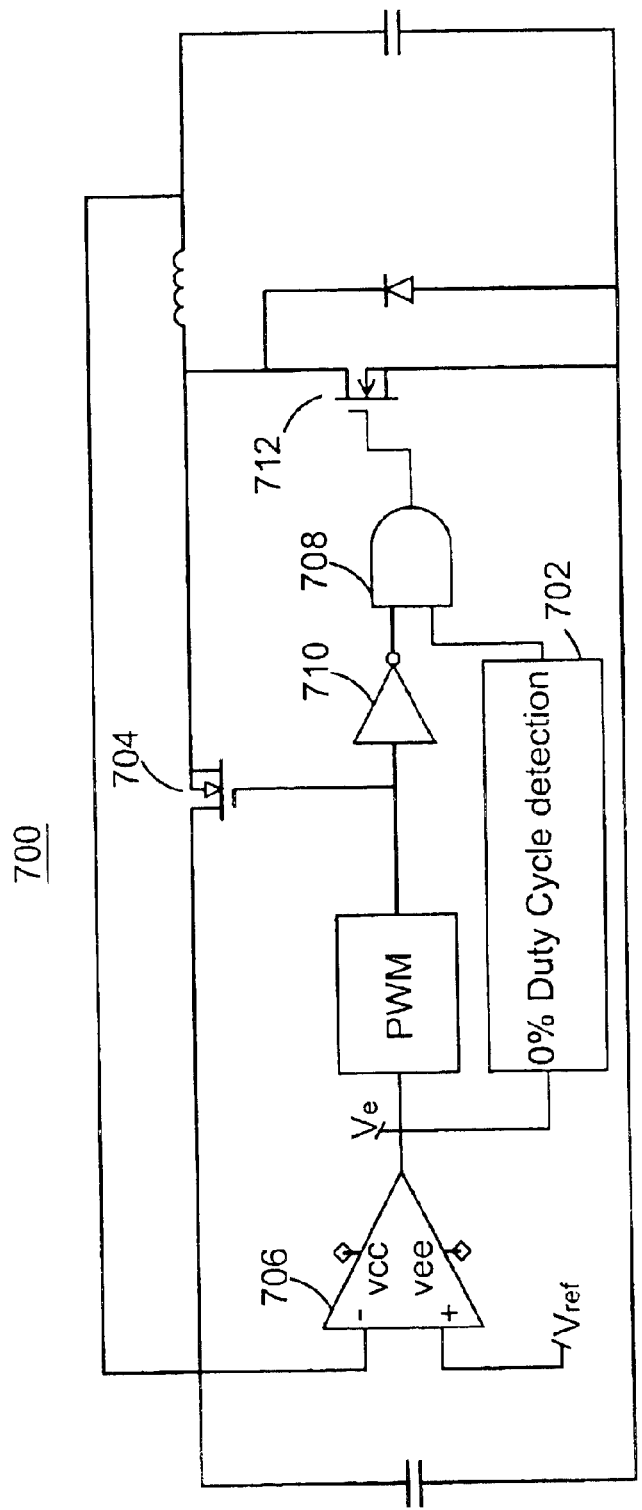
FIG. 7 shows a technique for improving transient performance during load step down according to the invention.

As illustrated in FIG. 7, the modified converter 700 includes a zero percent duty cycle detector 702 operative to provide an output signal indicating that series MOSFET 704 will be required to remain off throughout the entire switching cycle. This will happen if the voltage output is higher than the regulation point, for example, due to an overshoot resulting from load step down as noted above.

Recalling from the description of FIG. 1 that the output of PWM 124 is generated by comparing the error voltage $V_E$ with a triangular ramp having fixed peak and valley values, a $V_E$ value higher than the peak of the ramp will require a 100% duty cycle, and a $V_E$ value lower than the valley of the ramp, will require a 0% duty cycle. Zero duty cycle detection circuit 701 can therefore be a circuit which is connected to the output of error amplifier 706 to detect if $V_E$ goes lower than the fixed ramp valley voltage.

The output signal from zero duty cycle detector 702 is connected to one input of an AND gate 708. A second input is provided through an inverter 710 by the gating signal for series MOSFET 704. The output of AND circuit 709 drives the gate of shunt MOSFET 712, whereby both MOSFETS are held off and the inductor current can dissipate through the body diode of shunt MOSFET 712 when the duty cycle for series MOSFET 704 is zero.

As FIGS. 1 and 7 illustrate fully functional single phase controllers, the error voltage $V_E$ is readily available. In a multi-phase system as illustrated in FIG. 2, $V_E$ may not be accessible to each converter module. In that case, a separate disable signal for the shunt MOSFETS can be generated by providing a dedicated output from main controller 218 (see FIG. 2). Such an implementation, or an equivalent circuit for detecting the zero duty cycle condition, will be readily apparent to one skilled in the art in light of the disclosure herein.

Although the present invention has been described in relation to particular embodiments thereof, many other variations and modifications and other uses will become apparent to those skilled in the art. It is intended therefore, that the present invention not be limited not by the specific disclosure herein, but is to be given the full scope indicated by the appended claims.

What is claimed is:

1. A multi-phase synchronous buck converter comprising:
   a plurality of single phase buck converter stages, each stage including:
      a first switching transistor connected between an input node and a first node;
      a second switching transistor connected between the first node and a second node;
      a series inductor connected between the first or second node and an output node;
      a capacitor connected between the output node and the second node,
      the output nodes of all the individual converter stages being connected together to provide an output current to a load which is contributed to by all the converter stages;
      a drive circuit which is operative to turn the first and second switching transistors on and off according to a variable duty cycle thereby to regulate the voltage at the output node; and
      a sensing circuit including a variable gain current sense amplifier operative to determine the current through a selected one of the switching transistors when it is conducting thereby to generate an output signal representative of the output current provided by that converter stage; and
   a master controller operative to provide duty cycle control signals in a predetermined phase relationship for the switching transistors of the individual converter stages according to the difference between the output voltage from the multi-phase converter and a reference signal representing a desired voltage at the output node;
   the gains of the current sense amplifiers in each converter stage being preset such that the output signals from all the amplifiers are substantially equal, thereby balancing the power loss in all the converter stages by adjustment of the output currents using varying current sense gains to compensate for variations in the conductive path resistance of the selected switching transistors.

2. A device according to claim 1, wherein the gains of the current sense amplifiers are preset according to the differences between the actual values of the of the conductive path resistances of the selected switching transistors and an average value $R_{AV}$ of the resistance of the conductive path of a switching transistor of the type employed in the converter stages.

3. A device according to claim 2, wherein $R_{AV}$ is determined statistically from historical production test data.

4. A device according to claim 1, wherein the gains of the current sense amplifiers are preset according to the relationship:

$$A_1 = \left(1 + \frac{(R_{DS-1} - R_{AV})}{2R_{AV}}\right) * A_0$$

where $A_1$ is the amplifier gain for an I-th converter stage, $A_0$ is a nominal design gain value, $R_{DS-I}$ is the actual resistance of the conductive path of the selected switching transistor in the I-th converter stage, $R_{AV}$ is the average value of the resistance of the conductive path of switching transistors of the type employed in the converter stages.

5. A device according to claim 4, wherein $R_{AV}$ is determined statistically from historical production test data.

6. A device according to claim 1, wherein:
   the switching transistors are MOSFETS; and
   the gains of the current sense amplifiers are preset according to the differences between the actual $R_{DS-ON}$ values of the respective selected MOSFETS and an average value $R_{AV}$ of $R_{DS-ON}$ for MOSFETS of the type employed in the converter stages.

7. A device according to claim 6, wherein $R_{AV}$ is determined statistically from historical production test data.

8. A device according to claim 1, wherein:
   the switching transistors are MOSFETS;
   gains of the current sense amplifiers are preset according to the relationship:

$$A_1 = \left(1 + \frac{(R_{DS-1} - R_{AV})}{2R_{AV}}\right) * A_0$$

where $A_1$ is the amplifier gain for an I-th converter stage, $A_0$ is a nominal design gain value, $R_{DS-I}$ is the actual $R_{DS-ON}$ of the selected MOSFET in the I-th converter stage, $R_{AV}$ is the average value of $R_{DS-ON}$ of MOSFETS of the type employed in the converter stages.

9. A device according to claim 8, wherein $R_{AV}$ is determined statistically from historical production test data.

10. A device according to claim 1, wherein the selected switching transistor is the second switching transistor.

11. A method of providing balanced power loss in a multi-phase synchronous buck converter comprising a plurality of single phase buck converter stages having outputs connected together to contribute to an output current, each stage including first and second switching transistors which provide output current to an output node, a series inductor and a shunt capacitor connected to the output node, a drive circuit which turns the first and second switching transistors on and off according to a variable duty cycle to regulate the voltage at the output node, and a sensing circuit including a variable gain current sense amplifier, a master controller operative to provide duty cycle control signals in a predetermined phase relationship for the switching transistors of all of the converter stages according to the difference between the output voltage from the multi-phase converter and a reference signal representing a desired voltage at the output node;

the method comprising the steps of presetting the gains of the current sense amplifiers in each converter stage such that they all provide substantially equal outputs in response to a predetermined calibration current through a selected one of the switching transistors when in its conductive state; and determining the current through the respective selected switching transistors when they are conducting to generate a current sense amplifier output signals representative of the output current provided by the respective converter stages.

12. A method according to claim 11, wherein the gains of the current sense amplifiers are preset according to the differences between the actual values of the of the conductive path resistances of the selected switching transistors and an average value $R_{AV}$ of the resistance of the conductive path of a switching transistor of the type employed in the converter stages.

13. A method according to claim 12, wherein $R_{AV}$ is determined statistically from historical production test data, and the actual values of the of the conductive path resistances are determined by measuring voltage drops across the respective conductive paths.

14. A method according to claim 11, wherein the gains of the current sense amplifiers are preset according to the relationship:

$$A_1 = \left(1 + \frac{(R_{DS-1} - R_{AV})}{2R_{AV}}\right) * A_0$$

where $A_1$ is the amplifier gain for an I-th converter stage, $A_0$ is a nominal design gain value, $R_{DS-I}$ is the actual resistance of the conductive path of the selected switching transistor in the I-th converter stage, $R_{AV}$ is the average value of the resistance of the conductive path of switching transistors of the type employed in the converter stages.

15. A method according to claim 14, wherein $R_{AV}$ is determined statistically from historical production test data, and the actual values of $R_{DS-ON}$ are determined by measuring voltage drops across the respective conductive paths.

16. A method according to claim 11, wherein:

the switching transistors are MOSFETS; and the gains of the current sense amplifiers are preset according to the differences between the actual $R_{DS-ON}$ values of the respective selected MOSFETS and an average values $R_{AV}$ of $R_{DS-ON}$ for MOSFETS of the type employed in the converter stages.

17. A method according to claim 16, wherein $R_{AV}$ is determined statistically from historical production test data, and the actual values of $R_{DS-ON}$ are determined by measuring voltage drops across the respective conductive paths.

18. A method according to claim 1, wherein:

the switching transistors are MOSFETS; and the gains of the current sense amplifiers are preset according to the relationship:

$$A_1 = \left(1 + \frac{(R_{DS-1} - R_{AV})}{2R_{AV}}\right) * A_0$$

where $A_1$ is the amplifier gain for an I-th converter stage, $A_0$ is a nominal design gain value, $R_{DS-I}$ is the actual $R_{DS-ON}$ of the selected MOSFET in the I-th converter stage, $R_{AV}$ is the average value of $R_{DS-ON}$ of MOSFETS of the type employed in the converter stages.

19. A method according to claim 18, wherein $R_{AV}$ is determined statistically from historical production test data, and the actual values of $R_{DS-ON}$ are determined by measuring voltage drops across the respective conductive paths.

20. A method according to claim 18, wherein the selected MOSFET is the second MOSFET.

* * * * *